Figure 1:
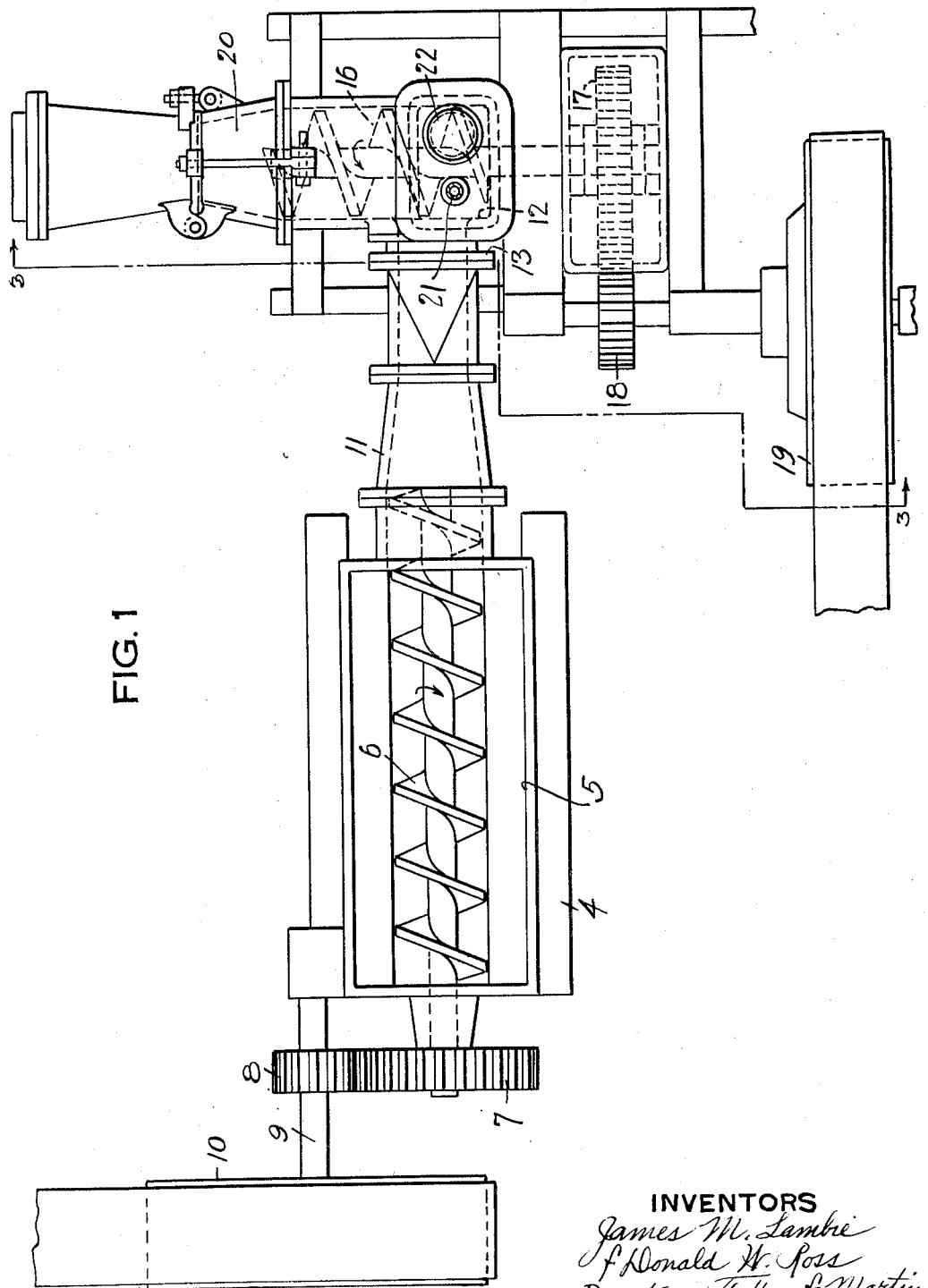

Jan. 18, 1927. 1,614,526
J. M. LAMBIE ET AL
METHOD OF AND APPARATUS FOR FORMING ARTICLES OF PLASTIC MATERIAL
Filed Dec. 30, 1924 3 Sheets-Sheet 1

INVENTORS
James M. Lambie
Donald W. Ross
By Kay, Totten & Martin,
Attorneys

Jan. 18, 1927. 1,614,526
J. M. LAMBIE ET AL
METHOD OF AND APPARATUS FOR FORMING ARTICLES OF PLASTIC MATERIAL
Filed Dec. 30, 1924 3 Sheets-Sheet 2

INVENTORS
James M. Lambie
Donald W. Ross
By Kay, Totten & Martin,
Attorneys

Jan. 18, 1927.  1,614,526
J. M. LAMBIE ET AL
METHOD OF AND APPARATUS FOR FORMING ARTICLES OF PLASTIC MATERIAL
Filed Dec. 30, 1924  3 Sheets-Sheet 3

INVENTORS

Patented Jan. 18, 1927.

1,614,526

UNITED STATES PATENT OFFICE.

JAMES M. LAMBIE AND DONALD W. ROSS, OF WASHINGTON, PENNSYLVANIA.

METHOD OF AND APPARATUS FOR FORMING ARTICLES OF PLASTIC MATERIAL.

Application filed December 30, 1924. Serial No. 758,856.

Our invention relates to a method of and apparatus for forming articles of plastic material, and particularly to means and a method whereby articles of plastic material may be formed with a minimum amount of entrapped air or air spaces therein.

As clay mixtures are prepared for the manufacture of glass melting pots and glass tank blocks these mixtures contain more or less air. The air is in the clay as small irregular shaped bubbles, or as large entrapped bubbles which are quite irregular in shape, and as air in the pores of the grog particles.

Elsewhere herein we speak of the air which is finely disseminated through the clay mass. A fruitful source of such air (or gas) is the pore space in the grog and raw clay. Air or other gases are concentrated in the pores of these materials at greater than the free air pressure, for on wetting these materials free air or other gas is liberated (driven out) into a volume of three to five times that of the pore space. Unless such air is entirely removed by saturating the grog with water, or better still, by drawing it off by means of a partial vacuum, air is left in the mass, which air may later appear as small bubbles or at least by its presence permit the grog particles and soft clay to be more readily torn asunder. It is this air from the grog, together with other air or gas disseminated through the clay, that we find objectionable, and we desire to supply pot makers with rolls free from such air.

The potter, in order to consolidate his clay and free it from air, "wedges" the lumps, that is, he bumps the lump of clay on alternate sides, repeatedly cutting it through with a wire, so as to release the air. By long working in this way, most of the air can be worked out of the clay.

In working the clay by machinery, a wet pan pugs the clay and mixes it in a much more satisfactory manner than a pug mill, but the clay from the wet pan is torn, ragged and full of air. In fact, air is rather beaten into the clay in the process of working it. A pug mill, although it does not work the clay so satisfactorily, extrudes a column which is much freer of air than some of the other types of machinery in use today.

Glass melting pots of about twenty-five hundred pounds in weight are usually made with bottom and side walls about four inches thick. In some of the larger pots the walls and bottoms are heavier. These pots are built up in "spells." The potmaker adding on about six inches in height of clay each day, until the building of the pot is completed. In order that this pot will hold the melted glass at the high temperature of the glass furnace, the walls must be as free as possible from air inclusions. The potmaker is therefore very careful, in building the pot, to knit the clay together well, to avoid entrapping air. For this reason, the clay is prepared for him in small cylinders, known in the trade as "rolls." These rolls are worked into the wall of the pot by hand, using what the pot-maker knows as hand courses and finger courses alternately. In working one spell on a pot, a pot-maker will use one hundred fifty (150) to two hundred (200) rolls, depending on the size of the pot. In hand coursing, this roll is spread out over an area about 4"×8", and in finger coursing over an area about 6"×10". The whole idea in building the pot in this manner is to weld the clay together thoroughly, and to avoid air pockets, particularly where subsequent rolls begin and end. If the rolls as given to the pot-maker are solid and free from small air holes, the roll will be worked into the wall of the pot, leaving no other holes than what the workman is unable to avoid.

We believe the use of vacuumized clay in the building up of pots and other handmade articles is unique. The building of vacuumized rolls into a pot produces a product that is free from all but the least objectionable holes, that is, those left by the workman.

If the roll is full of small air bubbles, the majority of these bubbles remain in the flattened roll after it is welded into the wall of the pot. As the roll is flattened out and worked into the wall of the pot, many of these bubbles are merely distorted and flattened out into planes parallel to the wall of the pot. In working a roll that contains air into a pot, or the like, some of the bubbles will be broken, allowing the air to escape, but many of the smaller ones will not be. When a bubble is flattened out, it makes rather a worse condition than a spherical shaped bubble, for the reason that a surprisingly small amount of air will keep two surfaces from engaging and knitting together. Thus bubbles in the clay tend to produce in the ultimate product a laminated structure.

In making a mixture for glass melting pots, we usually employ sufficient plastic clay to completely cover all of the burnt clay used in the mix. The plastic clay is the sticky portion which must glue the inert burnt clay particles together into a workable mass. The plastic clay, however, in burning shrinks, tending to leave very small cracks in this matrix of plastic clay, which surrounds the burnt clay particles. We therefore prefer to use no more plastic clay than is necessary. Minute air bubbles act just as foreign bodies, or other small grog particles, in the mix. By the use of clay from which substantially all the air has been removed, we are enabled to slightly reduce the amount of plastic clay necessary to give us the same bonding effect, as if the air had not been removed from the clay mix.

Tank blocks are made in wooden molds by laying a layer of plastic clay, similar to the clay that is used in making pots, in the bottom of the mold, and pounding it with a heavy maul until the various pieces have been welded together into a single layer. A second layer of clay is then put into the mold and similarly pounded until it has knit with the first layer. The workman in making the block is careful not to entrap air between the lumps of clay, but if the air is so entrapped, the shape of the bubble of air is usually only distorted by pounding, and the air not entirely removed, the air keeping the two adjacent surfaces of clay apart. By long and careful pounding, some of this air may be removed, but the smaller bubbles, which make the difference between vacuumized and unvacuumized clay, are not removed by pounding. We have discovered that by the use of vacuumized lumps of clay carefully fitted into the mold, before ramming, we can make a block substantially free from air holes, the only holes being those entrapped between the lumps of clay, as each lump of clay is an air free mass.

Removal of air from a plastic clay mass greatly increases its strength. A lump of unvacuumized clay as it comes from the wet pan or pug mill, if made into a cylinder and pulled apart, breaks with little elongation and contraction of area. A small cylinder extruded from our vacuum mill shows a very great elongation and contraction of the area before breaking.

The results of over one thousand separate cross breaking tests show that dried pieces which have been made from our vacuumized clay give higher breaking values, averaging around 8 per cent higher cross breaking strength.

Thus a lump of vacuumized clay may be worked into a pot or block without having other holes in the pot or tank block than are left by the operator in making the piece.

Air in small bubbles in the plastic clay mass acts just as small foreign bodies in the clay. It reduces the weight of the clay per unit volume, greatly lessens the strength of the clay and makes it less sticky.

Some of the objects of our invention are to provide a product substantially free from air bubbles; to provide a product having relatively great weight per unit of volume and therefore of increased strength; to reduce the quantity of plastic clay required to produce a structure that is more homogeneous, and hence more resistant to attack by molten glass or other heated substances; to produce a product wherein the particles composing the same are firmly held and not likely to be picked up by molten glass to later appear in the glass product as "stones" or other imperfections, and to simplify and improve generally the methods of and apparatus for making glass melting pots, flattening stones, and other articles of clay and the like.

Figure 2:
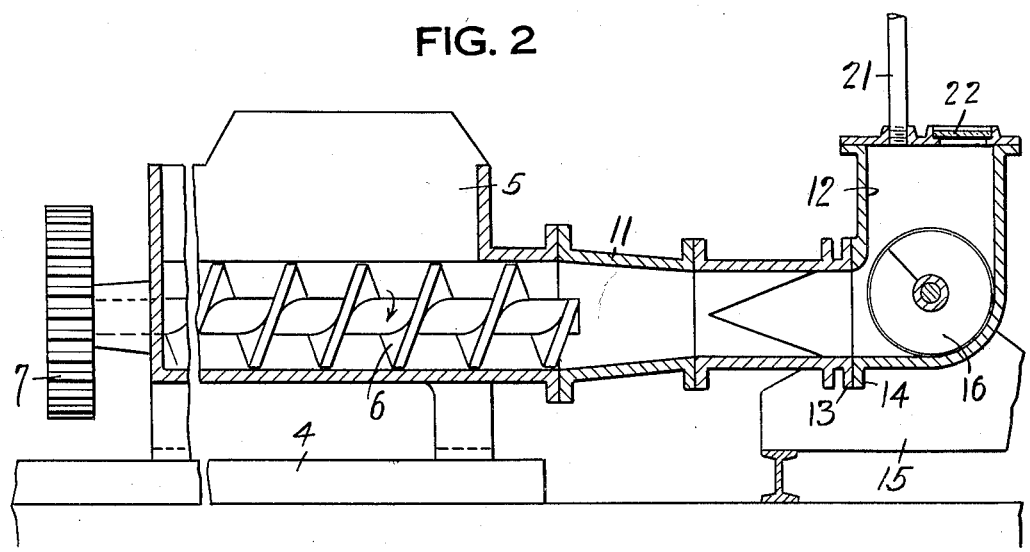
Figure 3:
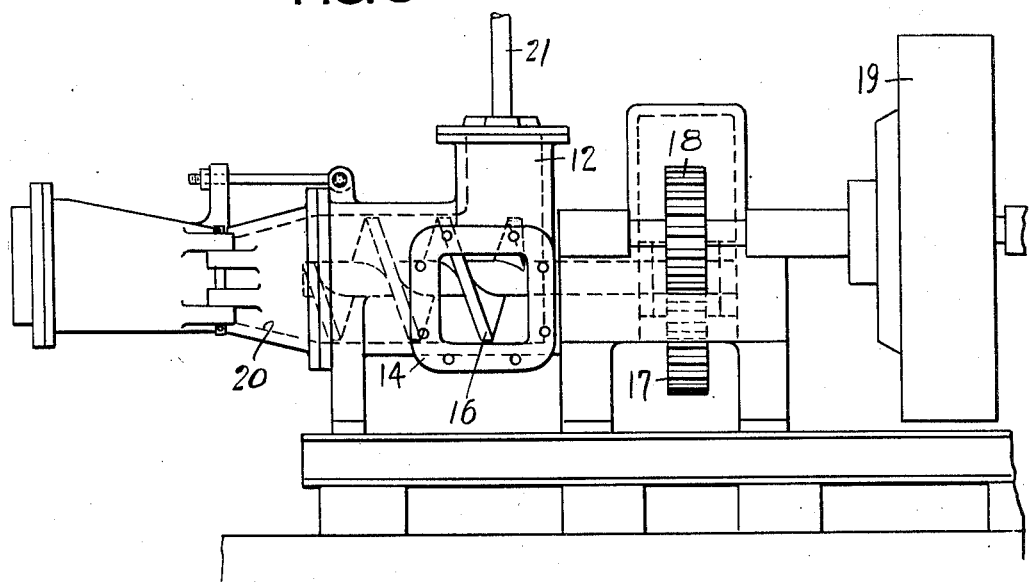
Figure 4:
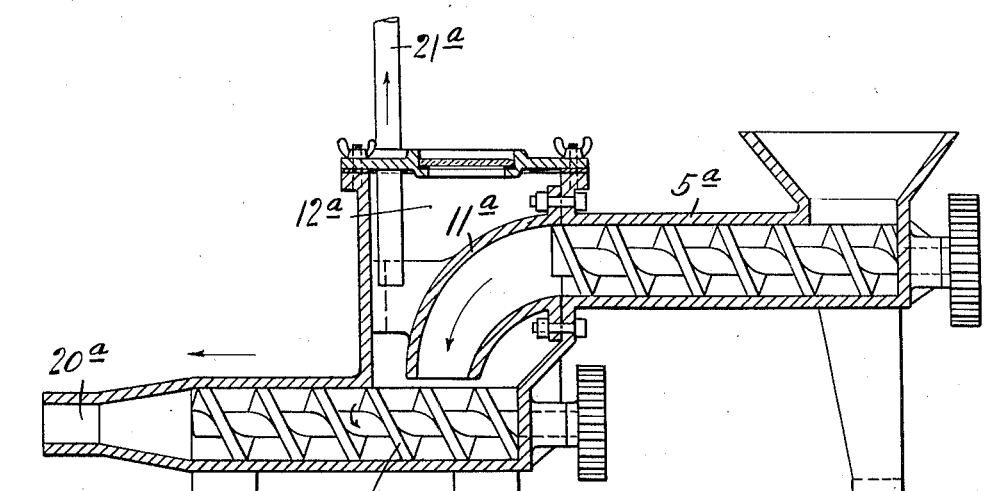

For the purpose of illustration, we have shown in the accompanying drawings a form of apparatus embodying our invention, and which may be employed for carrying out the process hereinafter described and claimed. In the drawings Fig. 1 is a view, partially in plan and partially in section, of the apparatus referred to; Fig. 2 is a side elevational view in section of the apparatus of Fig. 1; Fig. 3 is a view taken on the line 3—3 of Fig. 1, and Fig. 4 is a modification of the device of Figs. 1 to 3, and Fig. 5 is a partial plan view showing still another modification.

The apparatus shown in the drawings comprises means for working the clay and removing the air therefrom, and includes a base 4 upon which a chamber 5 is mounted. Within the chamber 5 is a screw or auger 6 that is mounted upon a shaft, to which a gear wheel 7 is secured. The gear wheel 7 is driven by a pinion 8 that is mounted upon a shaft 9, which also carries a pulley 10 that is driven from a suitable source of power. The casing 5 is provided at its forward end with a nozzle or reduced portion 11, which communicates with a second chamber 12. The nozzle 11 and the inlet to the chamber 12 are connected by means of flanges 13 and 14 that are bolted together as indicated in Figs. 2 and 3.

The chamber 12 is supported by a base 15 and a screw or auger 16 is mounted therein. The screw 16 is driven through a gear wheel 17, pinion 18 and pulley 19 in a manner similar to that in which the screw 6 is driven. It will be understood that these screws are rotated in a direction to force material from the inlet ends of the respective chambers to the outlet ends thereof. The outlet end 20 of the chamber 12 is of reduced cross-sectional area. The chamber 12 is further provided with an exhaust pipe 21 connected to a suitable vacuum or suction device (not shown). A glass covered opening 22 is also provided in the top of the chamber 12, so that the interior of the chamber may be viewed without disturbing the vacuum therein.

The clay, in a plastic condition, is introduced into the chamber 5 and the auger 6 rotated to compact and force clay through the reduced passage 11 into the side of the chamber 12. The clay enters the chamber 12 against the breast of the screw 16 and as the screw 16 is rotated in the direction indicated by the arrows, the clay will be carried downwardly.

We prefer to have the clay enter the vacuum chamber in such manner that the auger 16 will exert a slicing action thereon, because by cutting the incoming stream of clay into thin slices, and then pugging it, the air pockets present in it are broken, so that the clay is substantially air free as it is packed into a continuous piece in the barrel of the exit pugmill. We regulate the thickness of the slices by the relative speed of the two augers, the exit auger being revolved more rapidly than the first auger, so that the slices will be thin enough that all entraped air will be freed.

In mills of this general character, the tapered exits from the chambers, as well as the air pressure exteriorly thereof, tend to create a packing pressure on the clay in the barrel of the extruding auger, and to force it to rise in the vacuum chamber, thereby decreasing or cutting off communication between the suction pipe and the vacuum chamber. This tendency we overcome through the improved manner in which we feed the clay into the vacuumizing chamber or casing 12.

Clay that is in condition to knit properly by hand working in the construction of glass melting pots, is of a soft temper and very plastic (sticky). Such clay yields naturally to plastic flow so that it will normally pass through a die by the action of the auger of a pug mill. However, under considerable stress, such material assumes more or less the properties of fluid flow in which pressure on any one portion of a mass sets up pressure in the mass that tends to be relieved more or less completely in all directions. Thus if there is undue resistance to flow of such clay from the die of a pug mill, the knives of the auger in their travel will merely press the clay ahead of them, which clay being under considerable stress will behave as a fluid and flow back around the knives without advancing further into the barrel of the pug mill. The above is substantially established by atmospheric pressure against a column of such clay that is being extruded from a partial vacuum by a pug mill.

The ideas of introducing tempered clay into a partial vacuum, disintegrating and working it therein, and then extruding it from such partial vacuum, are not new. However, devices embodying the features particularly described herein are the only ones that successfully so treat materials having the properties of very plastic (sticky) clay of that soft temper that is required for proper knitting by hand or rammer.

The clay extruded through the outlets 20 and 20$^a$ may be in the form of rolls for building pots and the like, heretofore referred to, or larger rectangular lumps, or the apparatus may be employed for manufacturing full-sized articles, such as tank blocks, by directly extruding the vacuumized clay into the desired shape. Heretofore glass tank blocks and the like have not been successfully formed by an auger process because of the laminations usually found in such blocks, which are caused by the auger. These laminations have been caused by small portions of air contained in the clay mass collecting in the wake of the auger knives.

Another form of apparatus which may be employed, with very satisfactory results, is shown in Fig. 4. The initial pug mill 5$^a$ corresponds in its general operation to the pug mill 5 of Fig. 1, but the nozzle 11$^a$ thereof is of what might be called "gooseneck" form. This nozzle discharges the clay downwardly, so close to the screw 16$^a$ and the barrel of the second pug mill that the clay is swept into the barrel in such manner that back pressure therein is overcome, and the clay does not build up in the vacuum chamber 12$^a$. A vacuum is maintained in the chamber 12$^a$ by means of a vacuum pipe 21$^a$, as in the case of the chamber 12 and the pipe 21 of Fig. 2.

The accumulation of material in the vacuum chamber and eventual clogging of the passage leading to the source of vacuum is what renders other forms of apparatus unsatisfactory for use with such sticky material as pot clay.

Similarly the clay may enter the second pug mill at the bottom and close enough to the closed portion of the barrel thereof that it will be forced into said barrel.

Similarly the clay may enter the side of the second pug mill and close enough to the closed portion of the barrel thereof that it will be forced into said barrel.

If the clay enters the second pug mill on the ascending side of the second auger, it is necessary that it enter said second pug mill far enough away from the rear of the auger so that it will be compacted into the barrel of the second pug mill without accumulating in the hopper thereof. This entry may be totally or partially within the closed portion of the barrel of said second pug mill, depending upon the particular construction of the pug mills used.

Figure 5:
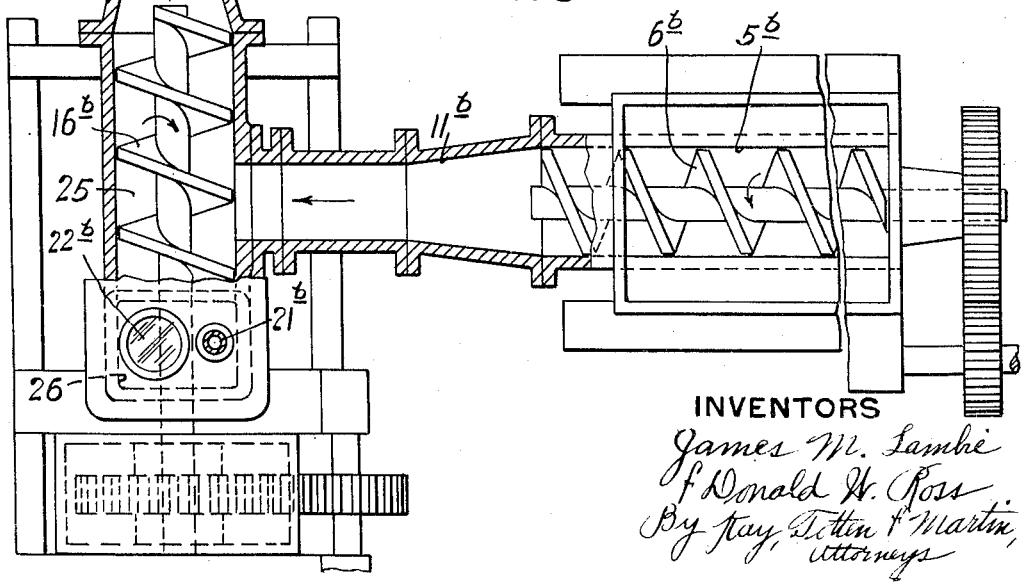

Referring now to Fig. 5, we provide a pair of pug mills similar to the mills of the other figures and provided with screws or augers 6ᵇ and 16ᵇ. The material is fed into the mill 5ᵇ and extruded therefrom through the orifice 11ᵇ into the barrel 25 of the second mill. The barrel is provided at its forward end with an orifice 20ᵇ, and at its rear end communicates with a vacuum chamber 26, to which an exhaust pipe 21ᵇ is connected. The chamber 26 is also provided with a glass covered opening 22ᵇ so that the operator may at any time determine whether the clay is backing up into the chamber 26. The auger 16ᵇ is driven from a pulley in a manner similar to the auger 16 of Fig. 1.

By introducing the clay from the first pug mill into the barrel 25 at a point intermediate the ends of said barrel, there is still less tendency for the material to be forced backward into the vacuum chamber with consequent danger of clogging the vacuum pipe 21ᵇ. At the same time, the air withdrawn from the incoming clay can flow back to the chamber 26 and be exhausted through the pipe 21ᵇ.

While we contemplate primarily the production of glass tank blocks, pots, floaters and flattening stones, it will be understood the articles produced by our method may be used advantageously in other relations.

We claim as our invention:

1. Clay treating apparatus comprising a pug mill having connection through a restricted opening with a second pug mill, an auger in the said second mill disposed in such position with respect to said orifice that upon rotation of the auger, thin slices of clay will be cut off from the advancing stream, the center line of the orifice being at a point removed from the top of said auger, and an extension at the upper part of said chamber, provided with means for permitting exit of air therefrom.

2. Clay treating apparatus comprising a pug mill having connection through a restricted opening with a second pug mill, and an auger in the said second mill disposed at an angle to said stream and in such position with respect to said opening that upon rotation of the auger thin slices of clay will be cut off from the advancing stream.

3. Clay treating apparatus comprising a pug mill having connection through a restricted opening with a second pug mill, and an auger in the said second mill disposed at right angles to said stream and in such position with respect to said orifice that upon rotation of the auger thin slices of clay will be cut off from the advancing stream, the said second chamber being provided with a restricted outlet through which the clay is extruded in a compact mass.

4. Clay treating apparatus comprising a pug mill having connection through a restricted opening with a second pug mill, an auger in the said second mill disposed in such position with respect to said orifice that upon rotation of the auger thin slices of clay will be cut off from the advancing stream, the center line of the orifice being at a point removed from the top of said auger, and an extension at the upper part of said chamber, provided with means for permitting exit of air therefrom, the material being introduced to said auger at such point that it is subjected to the action of vacuum when being transferred by said auger.

5. The method of treating clay which comprises providing a vacuum chamber having a mixing device therein and an orifice through which the material may pass from the mixing device, introducing clay into said mixing device at a point between the vacuum space in said chamber and the orifice, and subjecting said clay to a constant advancing force, whereby its tendency to move into the vacuum space is counteracted.

6. Clay treating apparatus comprising a pug mill, a second pug mill, and means for affording communication between said pug mills whereby material may be forced from one of said mills into the other, the auger of the second pug mill being run at a greater speed than the auger of the first named pug mill.

7. The method of treating clay, which comprises introducing clay into a chamber containing a mixing device and having an orifice at its forward end, subjecting the clay to an advancing force, and creating a vacuum in the chamber, at a point rearwardly of that at which the clay is introduced.

8. Clay treating apparatus comprising a barrel provided with an orifice at its forward end, an auger in said barrel, means for supplying clay to the barrel at a point intermediate the ends thereof and in position to be carried forward by the auger, and means for creating a vacuum in said barrel, at a point behind that at which the clay is introduced.

In testimony whereof we, the said JAMES M. LAMBIE and DONALD W. ROSS, have hereunto set our hands.

JAMES M. LAMBIE.
DONALD W. ROSS.